United States Patent [19]

Mauer

[11] Patent Number: 5,388,721
[45] Date of Patent: Feb. 14, 1995

[54] ASSEMBLY TOOL FED WITH COMPONENTS LINED UP ON A BELT

[75] Inventor: Dieter Mauer, Lollar, Germany

[73] Assignee: Emhart Inc., Newark, Del.

[21] Appl. No.: 960,764

[22] Filed: Oct. 14, 1992

[30] Foreign Application Priority Data

Oct. 15, 1991 [DE] Germany .............. 4134096

[51] Int. Cl.⁶ ........................................... B65H 5/28
[52] U.S. Cl. ..................................... 221/74; 227/136
[58] Field of Search .............. 221/30, 71, 74, 25, 221/26, 72; 227/16, 18, 136, 149

[56] References Cited

U.S. PATENT DOCUMENTS

| | | | |
|---|---|---|---|
| 2,979,726 | 4/1961 | Carlzen et al. | 221/74 |
| 3,057,528 | 10/1962 | Cole et al. | 221/30 |
| 3,193,167 | 7/1965 | Newton | 227/132 |
| 4,009,627 | 3/1977 | High | 221/30 |
| 4,367,837 | 1/1983 | Manino | 227/136 |
| 4,615,475 | 10/1986 | Fuhrmeister | 227/136 |

FOREIGN PATENT DOCUMENTS

| | | |
|---|---|---|
| 8614261 | 8/1986 | Germany . |
| 599544 | 4/1948 | United Kingdom . |
| 8404710 | 12/1984 | WIPO . |
| 9002688 | 3/1990 | WIPO . |

*Primary Examiner*—Kenneth W. Noland
*Attorney, Agent, or Firm*—E. D. Murphy

[57] ABSTRACT

Assembly tool for detaching and applying components lined up continuously and attached to a belt or tape at an assembly position in which one component after the other is successively separated from the tape and ejected, in which the tape is placed over an encircling continuous conveyor belt which positively engages the tape and entrains it with the advance of the conveyor belt, the conveyor passing together with the equipped tape through a driving-in region for gripping the tape prior to the assembly position and a driving-out region for carrying off the remaining tape after the assembly position and being deflected round the assembly position substantially in the form of a V at the assembly position.

23 Claims, 5 Drawing Sheets

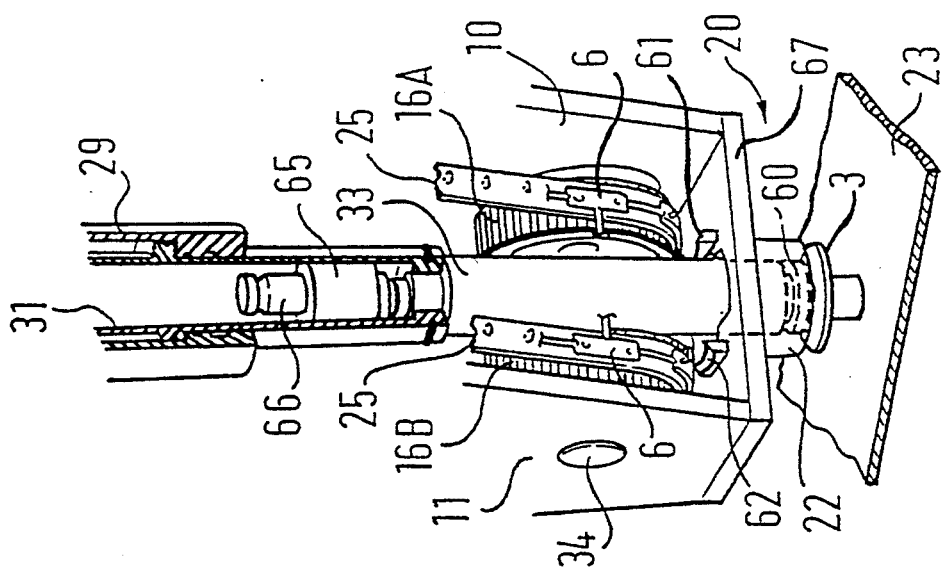
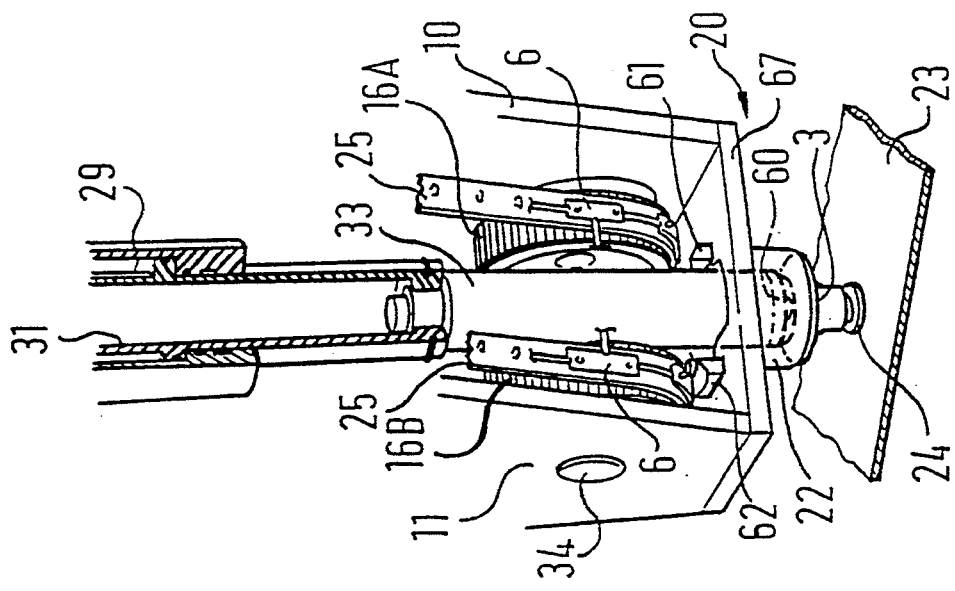
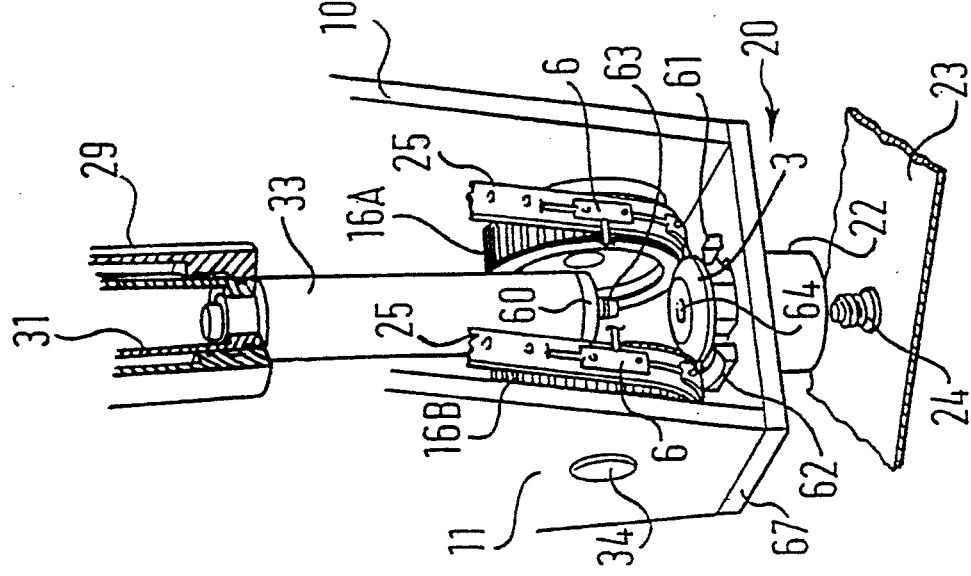

ASSEMBLY TOOL FED WITH COMPONENTS LINED UP ON A BELT

BACKGROUND OF THE INVENTION

The invention relates to an assembly tool for detaching and applying components lined up and attached to a belt or tape at an assembly position in which one component after the other is successively separated from the tape and ejected. The thus ejected components may be then applied in an intended sequence.

Tapes for lining up components are already widely used, particularly where components are to be processed repeatedly on a large scale in an assembly position. In these cases, the tape forms an advantageous aid for automatic conveyance of the components to the assembly position in which the components are separated from the tape and processed as desired according to their application.

A tape for lining up nails and an assembly tool serving to separate the individual nails and to drive them in is known from DE-OS 36 06 901. In that patent, the tape is formed by guide bushes for the individual nails and cross members connect the guide bushes to one another. The assembly tool for the nails combined in this way to form a tape contains a guide channel which converges radially to an expulsion bore of which the cross section is adapted to the profile of the tape equipped with nails. A piece of the tape containing several nails is inserted into this advance channel as a sort of magazine with a limited number of nails, the foremost nail entering the expulsion bore. A spring-loaded slider presses the rear end of the magazine. For separating and driving in a nail with the mounting surrounding the nail as a constituent of the tape, a piston is used which is contained in the assembly tool and advances into the expulsion bore, separates the nail with its mounting and, during a further advance, drives the nail into any workpiece. After the piston has been returned, the magazine is advanced by one nail so that another nail with its mounting is available in the expulsion bore for the next operation. The entire magazine is processed in this way to the last nail, whereupon a new piece of tape is inserted into the guide channel as a magazine.

When using components which are lined up virtually continuously onto a belt or tape and can have different forms, the known supply of individual components by removal from a magazine is unsuitable as, when using an assembly tool known from DE-OS 36 06 901, the assembly tool has to be adapted with respect to the expulsion bore and the supply channel in each case, depending on the form of the component. Furthermore, the spring-loaded slider used with the known assembly tool is unsuitable in the case of components which are lined up virtually continuously on a tape.

For supplying continuously taped electrical elements, a tape has already been provided according to DE-OS 35 44 221 which, in addition to the row of elements, has a row of holes in the manner of a punched tape. Projections of a spiked roller by means of which the tape with the elements is guided stepwise into an assembly position engage in the holes of this row of holes. In the assembly position, one respective element is removed from the tape which is preserved, at least with respect to its perforated region, and therefore has adequate internal stability to be carried off by the spiked roller.

In our co-pending German patent application DE 41 09 772.6 (EP 0 506 307) is described and claimed a belt providing continuous lining up of plastics components which are attached to one another by a lateral thread extending on the plastics components such that, during conveyance of the belt one plastics component after another reaches an assembly position in which the plastics component is separated from the belt, characterised in that at least one guide element which can be grasped during conveyance of the belt is moulded integrally on each plastics component such that during the moulding of plastics component and guide element, one or more threads are moulded on the guide element, plastics component and guide element being connected via at least one crosspiece which can be disconnected in the assembly position, in which the plastics component is held in a defined manner by means of the guide element.

It is one object of the invention to provide an assembly tool of the type mentioned above which allows the processing of continuously taped components of different form with high positional accuracy during the separation and ejection of the components and reliably carries off the remaining tape freed from the components.

It is one particular object of the invention to provide such an assembly tool which can be fed with a belt such as those described in EP 0 506 307.

BRIEF DESCRIPTION OF THE INVENTION

According to the present invention, we provide an assembly tool for detaching and applying components lined up continuously and attached to a belt or tape at an assembly position in which one component after the other is successively separated from the tape and is ejected, characterised in that the tape is placed over an encircling continuous conveyor belt which positively engages the tape and entrains it with the advance of the conveyor belt, the conveyor belt passing together with the equipped tape through a driving-in position and a driving-out region for carrying off the remaining tape after the assembly position and being deflected round the assembly position substantially in the form of a V at the assembly position.

The use of the conveyor belt which positively engages and grips the tape in a driving-in region prior to the assembly position and in a driving-out region after the assembly position ensures that the tape is orientated as it is transferred into the assembly position where the tape guided by the conveyor belt with appropriate curvature for the precisely positioned separation and ejection of one respective component is made available owing to the deflection of the conveyor belt with the tape giving rise to an assembly tool which advances slimly into the assembly position and can be brought without difficulty to all possible constructional parts into which the respective components are to be inserted. Furthermore, the driving-out region of the conveyor belt ensures that the remaining tape is reliably carried off by it for disposal so internal stability does not have to be demanded of it.

The assembly tool is preferably arranged so that the driving-in region and the driving-out region are arranged on both sides of an ejection tool directed toward the assembly position, the conveyor belt being guided via deflecting rollers on the one hand in the region of the assembly position and on the other hand to the side of the ejection tool. This gives rise to longer stretches in each case between the deflecting rollers arranged in the region of the assembly position and the deflecting rollers in the driving-in and driving-out region, the conveyor belt positively gripping the tape and therefore giving it particularly reliable guidance both before and after the assembly position in these longer stretches.

It is advantageous to use at least one of the deflecting rollers to drive the conveyor belt. The deflecting roller thus used as a driving roller is preferably placed into the driving-out region as the conveyor belt is then exposed to a pull downstream of the assembly position, ensuring that the conveyor belt is pulled taut through the driving-in region as well as through the assembly position into the driving-out region.

The ejection tool can be coupled to the driving roller, more specifically such that an advance step of the conveyor belt is triggered with each return stroke of the ejection tool. A corresponding advance step of the conveyor belt is therefore immediately produced together with the respective processing of a component so that a new component is available in the assembly position for the next cycle.

To ensure symmetrical driving of the tape, the conveyor belt is advantageously constructed in two parts, the ejection tool being arranged in a space between the two conveyor belt parts. In this case, the two-part conveyor belt is guided in the region of the assembly position round a two-part deflecting roller and round a further two-part deflecting roller on both sides of the ejection tool on the side of the driving-in and of the driving-out region in each case, resulting in symmetrical guidance of the conveyor belt over its entire length and therefore correspondingly symmetrical driving of the tape.

The ejection tool is preferably allocated a separating blade for separating a component from the tape and a ram for gripping and ejecting the component from the assembly position so that the component is easily separated from the tape during the ejection process and the precise positioning of the respective component ensured by the conveyor belt is not lost.

In order additionally to fasten an ejected component optionally at a receiving point of a module in striking manner, for which purposes a special assembly force may be required, the ram is preferably provided such a striking member which, after ejection of the component, strikes the component via the ram, thus serving to set the component.

To simplify disposal of the remaining tape, a cutting device for reducing the size of the remaining tape can be provided after the driving-out region. The remaining tape leaving the driving-out region can easily be carried off in a reduced form in this way and the material can optionally be re-used.

A particularly advantageous design of the conveyor belt is produced if the conveyor belt is constructed as a toothed belt with projections arranged on the side remote from the teeth for positive engagement in the tape.

BRIEF DESCRIPTION OF THE DRAWINGS

In order that the invention can be better understood, a preferred embodiment will now be described in greater detail by way of example with reference to the accompanying drawings in which.

DETAILED DESCRIPTION OF DRAWINGS AND PREFERRED EMBODIMENT

Figure 1:
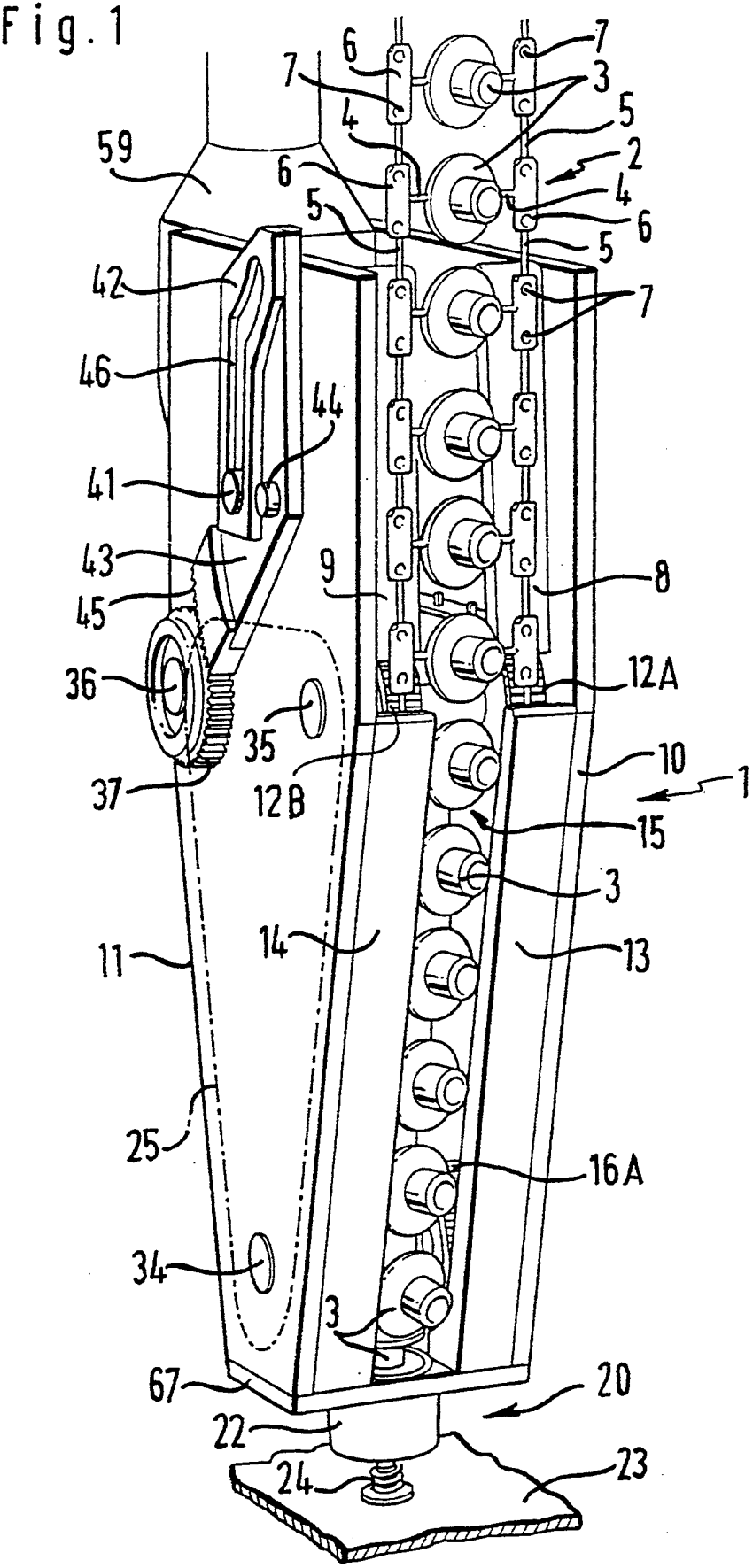
FIG. 1 shows shows in perspective an entire assembly tool according to the invention with a drawn-in tape.

FIG. 1 shows a view of the entire assembly tool 1 into which tape 2 is drawn. The tape 2 consists of lined-up components 3, in this case push-buttons, which are held together via cross members 4 with two threads 5 extending longitudinally on both sides of the tape 2. The threads 5 pass through guide elements 6 into which the cross members 4 open. The components 3, the cross members 4 and the guide elements 6 are formed in one piece from plastics material. The guide elements 6 are each provided with two positioning holes 7, the function of which will be described in more detail below. The tape 2 consisting of the components 3 with the cross members 4 and the threads 5 containing the guide elements 6 is introduced into the assembly tool, the guide elements 6 sliding along on two rear guide rails 8 and 9 which are each fastened on the two lateral walls 10 and 11. The tape 2 then passes into the region of a pair of toothed deflecting rollers 12A and 12B and then passes into the region of front guide rail 13 and 14. The two front guide rails 13 and 14 are also fastened on the two lateral walls 10 and 11. The region covered by the front guide rails 13 and 14 forms a driving-in region 15 for gripping the tape 2 (see FIG. 2). At the lower end of the driving-in region 15, the tape 2 passes into the region of a front, toothed deflecting roller 16 by means of which the tape 2 is appropriately deflected. The tape 2 then passes into driving-out region 17 (see FIG. 2), which is not shown in FIG. 1, and is conveyed similarly to the driving-in region 15 by two guide rails 18 and 19 (see FIG. 3).

The deflecting roller 16 is arranged in the region of assembly position 20 in which a respective component 3 is removed from the tape 2 and ejected. Details of this last procedure are given when discussing FIGS. 5a, b and c. However, it is pointed out that the component 3 constructed as a push-button is separated from the tape 2 by an ejection tool 21 shown in detail in FIG. 3 and is ejected through mouthpiece 22 and is pressed onto a stud 24 welded onto a plate 23 in the embodiment illustrated.

Further details of other members shown in FIG. 1 will be described hereinafter in relation to the other Figures.

The tape 2 is guided exactly by the conveyor belt 25 which is not shown in detail in FIG. 1 (see FIGS. 2 and 5) and of which the position is indicated by the dot dash line 25 in FIG. 1.

Figure 2:
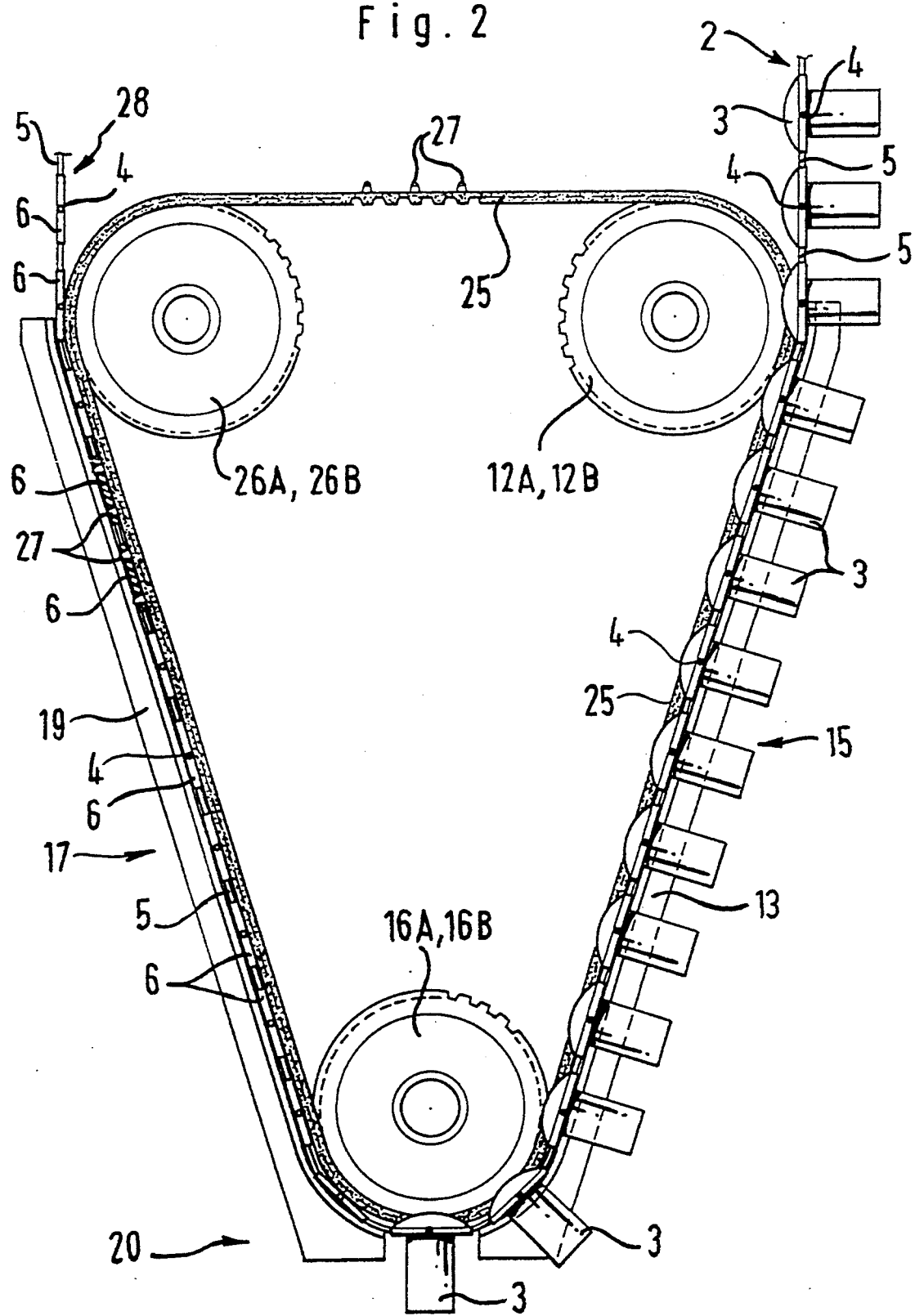
FIG. 2 shows a basic view of the guidance of a conveyor belt together with the tape via three deflecting rollers.

FIG. 2 shows the internal design of the assembly tool 1, restricted to the supplied tape 2, the conveyor belt 25 and the two deflecting rollers 12, 16 and the deflecting roller 26 not shown in FIG. 1. The driving-in region 15 therefore extends between the deflecting roller 12 and the deflecting roller 16, and the driving-out region 17 between the deflecting roller 16 and the deflecting roller 26. The deflecting roller 16 is arranged in the region of the assembly position 20.

Figure 3:
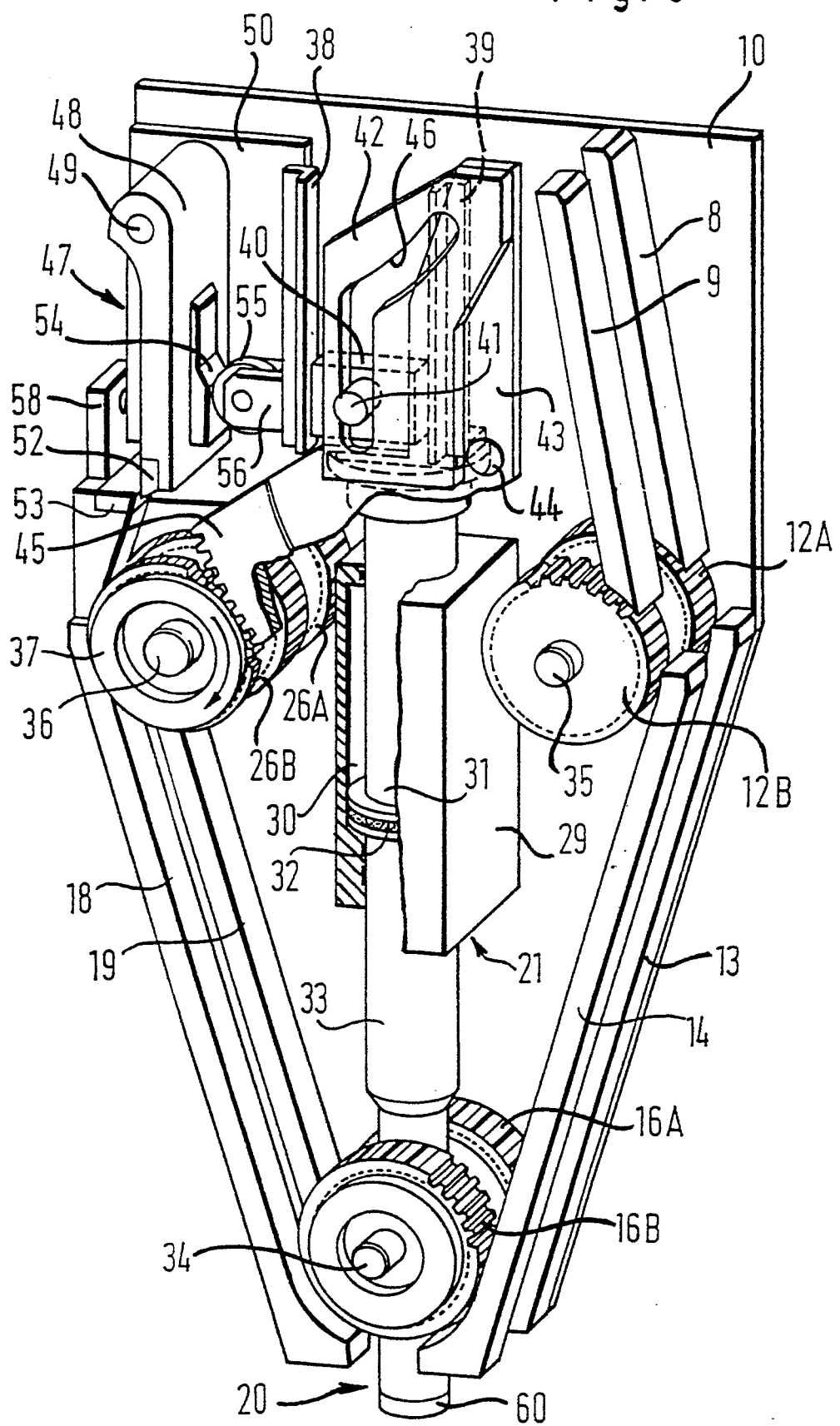
FIG. 3 shows in perspective the assembly tool without the front side wall and without a tape.

FIG. 2 also shows the front guide rail 13 and the guide rail 19 appropriately arranged in the driving-out region 17 (see FIG. 3). The conveyor belt 25 is placed substantially in the form of a V round the deflecting roller 16 in the assembly position 20 so that the assembly position 20 is given a relatively narrow end face from which the assembly tool 1 extends relatively slimly back toward the deflecting rollers 12 and 26. The tape 2 with its components 3 fits snugly on the conveyor belt 25 from the exterior. The conveyor belt 25 is provided with spikes 27 which project outwardly from it and engage the positioning guide holes 7 (see in FIG. 1) and therefore guarantee correctly positioned guidance of the tape 2. The conveyor belt 25 is constructed as a toothed belt which is guided exactly by the toothed deflecting rollers 12, 16 and 26. The tape 2 is guided with its components 3 through the driving-in region 15 into the assembly position 20 where the component momentarily held there is separated from the tape 2 and ejected in a manner described in more detail with reference to FIG. 3. The subsequent remaining tape 28 consisting of two threads 5, guide elements 6 and cross members 4 then leaves the assembly tool in the region of the deflecting roller 26.

FIG. 2 shows the structure contained in the assembly tool according to FIG. 1 from the side so that, of the two-part deflecting rollers 12, 16 and 26, only the parts facing the lateral wall 11 can be seen in FIG. 2. The same applies to the two-part conveyor belt 25.

Further members of the assembly tool 1 which are arranged substantially in the interior between the lateral walls 10 and 11 (see FIG. 1) are shown in FIG. 3. For the sake of clarity, the conveyor belt 25 and the tape 2 are not shown in FIG. 3. FIG. 3 shows that the deflecting rollers 12A, 12B, 16A, 16B and 26 B (26A is not shown) are constructed in two parts in order, on the one hand, to guarantee symmetrical guidance of the tape 2 and, on the other hand, to make the necessary space available for the ejection tool 21.

The ejection tool 21 containing housing 29 with internal cylinder 30 fastened on the lateral walls 10 and 11 is arranged in the centre of the assembly tool 1. Piston 31 with its seal 32 which is lengthened from the housing 29 toward the assembly position 20 by ram 33 is mounted in the housing 29. The ram 33 which is shown in its extended position in FIG. 3 serves to separate a component 3 from the tape 2 and to eject it. The ram 33 projects between the two parts 16A and 16B of the respective deflecting roller. The two-part deflecting roller 16A and 16B is mounted in each case on an axle journal 34 (which is not continuous) in the two lateral walls 10 and 11. The deflecting roller 12A and 12B is mounted via axle 35 which is continuous here. The deflecting roller 26A and 26B (only part 26B being shown in FIG. 3) is mounted in a similar manner, namely on continuous axle 36, which carries the driving toothed wheel here outside and the lateral wall 11.

Owing to the deflection of the tape in the assembly position, the tape guided by the conveyor belt is available for the exactly positioned separation and ejection of a respective component, and owing to the substantially V-shaped deflection of the conveyor belt with the tape an assembly tool is provided which extends slimly into the assembly position and which can readily be brought to all possible modules into which the respective components are to be inserted. Furthermore, the driving-out region of the conveyor belt ensures that the remaining tape is reliably carried off by it for disposal, no internal stability being required of the remaining tape.

The conveyor belt now shown in FIG. 3 is driven via driving gear wheel 37 by means of the ejection tool 21, more specifically in the following manner: the piston 31 projects from the rear end of the housing 29 and carries slider 40 which is arranged between two guide rails 38 and 39 and from which entrainer bolt 41 projects. The entrainer bolt engages in slotted link 42 which is arranged on an angled lever 43 (see FIG. 1). The angled lever 43 is mounted on axle 44. The arm of the angled lever 43 facing the driving gearwheel 37 engages with toothed quadrant 45 in the teeth of the driving gearwheel 37 so that the driving gearwheel 37 is correspondingly rotated during rotation of the angled lever 43.

When the entrainer bolt 41 is moved to-and-fro during the reciprocating movement of the piston 31, the entrainer bolt 41 slides through groove 46 in the slotted link 42 and therefore pivots the angled lever 43 to-and-fro according to the design of the groove 46. This results in a corresponding drive for driving gear wheel 47. In order that a forward movement of the conveyor belt 25 takes place only in the desired conveying direction, a free wheel is located between the axle 36 on which the deflecting roller 26A and 26B acting as a driving roller fits tightly, and the driving gear wheel 37, which free wheel acts only in one direction of rotation and allows entrainment of the axle 36 only when the driving gear wheel rotates in the direction of the indicated arrow, corresponding to the return stroke of the piston 31 after ejection of a component 3. This ensures that a new component 3 is immediately brought into the assembly position 20 with the return stroke of the piston 31.

FIG. 3 also shows a cutting device 47 with which a remaining tape conveyed on by the deflecting roller 26A and 26B is cut into individual parts to allow easy disposal.

Figure 4:
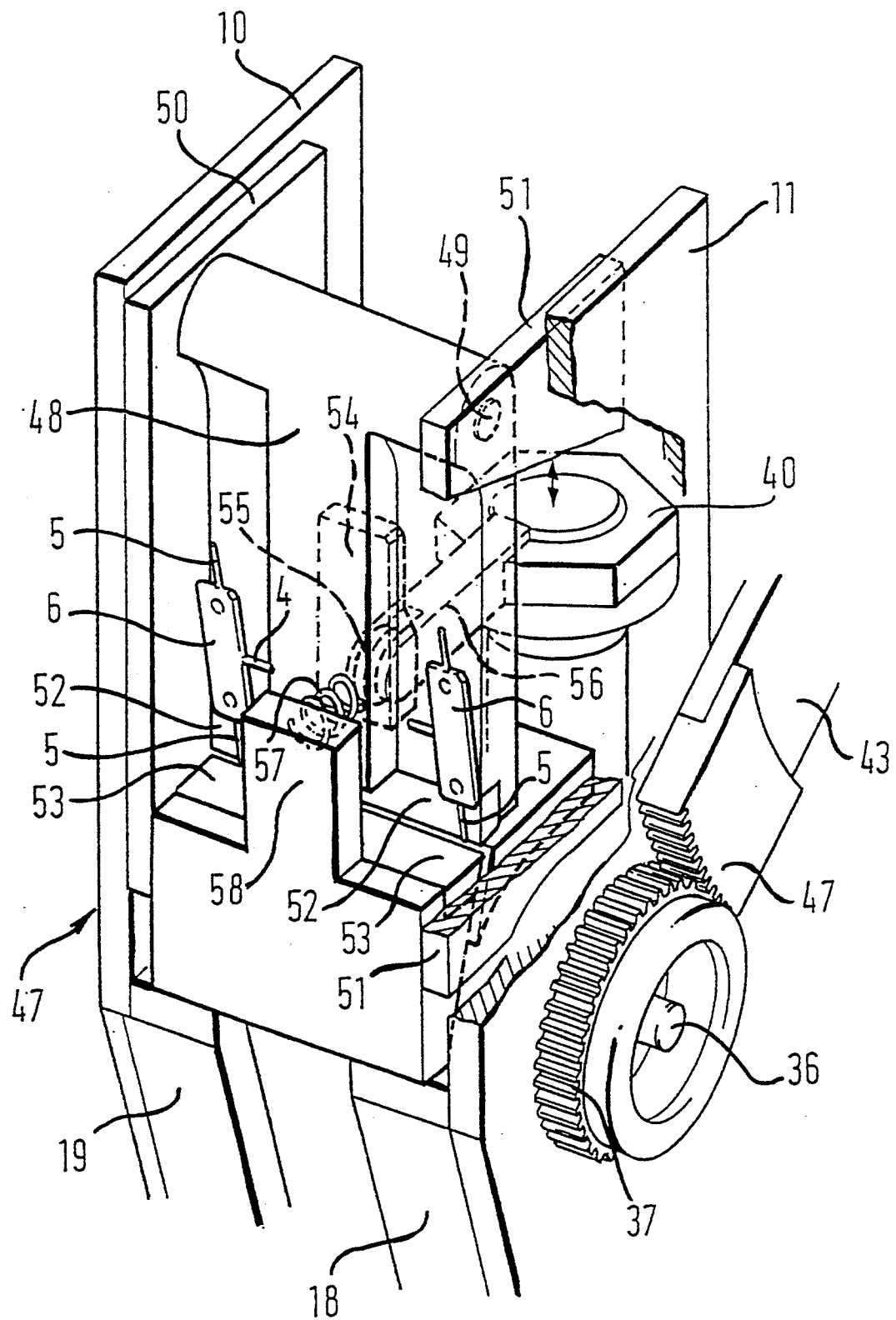
FIG. 4 shows in perspective the cutting device for reducing the size of the remaining tape, and FIGS. 5a, b and c show the part of the assembly tool containing the assembly position in three operating positions.

The cutting device 47 is shown in an enlarged perspective view in FIG. 4. It contains a pivoting blade 48 which is pivotally mounted round axle 49. The axle 49 is carried by carrying walls 50 and 51 which are joined to the lateral walls 10 and 11. Blade insert 52 which co-operates with rigid opposing blade 53 is arranged at the end of the pivoting blade 48 remote from the axle 49. The pivoting blade 48 is moved to-and-fro by means of cam 54, more specifically by means of roller 55 which is rotatably mounted in arm 56. The arm 56 is fastened on the slider 40 and is moved to-and-fro during the stroke of the piston 31 (see double arrow drawn in FIG. 4). After the roller 55 has performed an up-and-down movement, it slides over the cam 54 and therefore pivots the pivotal blade 48 to- and-fro.

The remaining tape, two guide elements 6 and the adjacent threads 5 of which are indicated in FIG. 4, is introduced into the gap existing in the rest position of the pivoting blade 48 between the blade insert 52 and the opposing blade 53. The parts of the remaining tape shown in FIG. 4 are separated during the pivoting of the pivoting blade 48 and are therefore available for disposal in this shortened form. the pivoting blade 48 rests via helical spring 57 against abutment 58 which is arranged rigidly between the lateral walls 10 and 11.

FIG. 1 shows, in the region of the cutting device 47 not shown in detail therein, suction tube 59 which is slipped over the cutting device 47 and there sucks away and carries off parts of the remaining tape.

FIGS. 5a, b and c show three operating phases of the assembly tool 1, only assembly position 20 being drawn.

To clarify the assembly position 20, the component 3 succeeding in the tape 2 is not shown in each case.

FIG. 5a shows the piston 31 in its rear position in which it waits above the component 3 on its forward stroke (rest position). The ram 33 has, at its end facing the component 3, blade plate 60 which projects beyond the component 3 somewhat so that it brushes past two opposing blades 61 and 62. the cross members 4 which are severed by the blade plate 60 during the forward stroke of the piston 31 extend over the two opposing blades 61 and 62 so that the component 3 can be ejected from the tape 2. Centering peg 63 arranged in the centre of the ram 33 is set in a hole 64 in the component 3 which is therefore guided exactly by the centering peg 63 and ejected through the mouthpiece 22 and is pressed onto the stud 24 shown here.

This position where the component 3 is pressed onto the stud 24 is shown in FIG. 5b.

FIG. 5c shows a special feature of the assembly tool where a striking member 65 which can be secured in the interior of the piston 31 by means of a boss 66 is arranged in the piston 31. Owing to the release of the striking member 65, the striking member 65 is rapidly driven toward the rear end of the ram 33 and therefore gives the ram 33 a hard blow which serves to fix the component 3 finally and firmly on the stud 24.

The two opposing blades 61 and 62 are fastened on the terminal plate 67 connecting the two lateral walls 10 and 11.

It is claimed:

1. Assembly tool for detaching and applying components lined up continuously and attached to a tape at an assembly position in which one component after the other is successively separated from the tape and delivered to a workpiece, comprising:
   a continuous conveyor belt;
   means on the surface of said belt for positively engaging the tape to advance the tape with advancing movement of said conveyor belt;
   first guide means forming a driving-in region located prior to the assembly position and second guide means forming a driving-out region located after the assembly position;
   a triangular array of rollers including a drive roller supporting said conveyor belt and the tape for sequential passage through said first guide means, said assembly position and said second guide means;
   said drive roller being located at the end of said second guide means and positively engaging said belt to draw said belt and said tape through said sequential passage.

2. Assembly tool according to claim 1, wherein said driving-in region and said driving-out region are arranged on both sides of an ejection tool directed toward the assembly position, said conveyor belt being guided via said rollers through the region of the assembly position so that the tape passes in front of said ejection tool.

3. Assembly tool according to claim 2, wherein said ejection tool is coupled to said drive roller such that an advance step of said conveyor belt is triggered with each return stroke of said ejection tool.

4. Assembly tool according to claim 2, wherein said ejection tool has a separating blade for separating a component from the tape and a ram for gripping and ejecting the component from the assembly position.

5. Assembly tool according to claim 4, wherein said ram is provided with a striking member which, after ejection of the component, strikes the component, via said ram, thus serving to set the component.

6. Assembly tool according to claim 1 including two conveyor belts, said ejection tool being arranged in a space between said two conveyor belts.

7. Assembly tool according to claim 6, wherein each of said rollers comprises two interconnected parts, one of said parts of each of said rollers supporting one of said belts.

8. Assembly tool according to claim 1, wherein a cutting device is provided after said driving-out region to reduce the size of the remaining tape.

9. Assembly tool according to claim 1, wherein said conveyor belt is constructed as a toothed belt with projections arranged on the side remote from the teeth for positive engagement in the tape.

10. Assembly tool as claimed in claim 1 wherein said first guide means and said second guide means are positioned in close proximity to said belt to retain the tape in engagement with said positive engagement means throughout said sequential passage.

11. Assembly tool for detaching and applying components lined up continuously and attached to a tape at an assembly position in which one component after the other is successively separated from the tape and assembled to a workpiece, comprising:
    a continuous conveyor belt;
    means on said belt for positively engaging the tape to advance the tape with advancing movement of said conveyor belt;
    first guide means forming a driving-in region located prior to the assembly position and second guide means forming a driving-out region located after the assembly position;
    a triangular array of rollers including a drive roller supporting said conveyor belt and the tape for sequential passage through said first guide means, said assembly position and said second guide means;
    said drive roller being located at the end of said second guide means and positively engaging said belt to draw said belt and said tape through said sequential passage;
    one of said rollers defining one corner of said triangular array at the assembly position, said one corner being spaced a larger distance from each of the other corners than said other corners are from each other so that said conveyor belt and the tape travel along a V-shaped path through said assembly position.

12. Assembly tool as claimed in claim 11 wherein a plurality of said positive engagement means are provided to engage the tape adjacent each successive component.

13. Assembly tool according to claim 11, wherein said driving-in region and said driving-out region are arranged on both sides of an ejection tool directed toward the assembly position, said conveyor belt being guided via said rollers through the region of the assembly position so that the tape passes in front of said ejection tool.

14. Assembly tool according to claim 13, wherein said ejection tool is coupled to said drive roller such that an advance step of said conveyor belt is triggered with each return stroke of said ejection tool.

15. Assembly tool according to claim 11 including two conveyor belts, said ejection tool being arranged in a space between said two conveyor belts.

16. Assembly tool according to claim 15, wherein each of said rollers comprises two interconnected parts, one of said parts of each of said rollers supporting one of said belts.

17. Assembly tool for detaching and applying components lined up continuously and attached to a tape at an assembly position in which one component after the other is successively separated from the tape and assembled to a workpiece, comprising:
- a continuous conveyor belt;
- means on said belt for positively engaging the tape to advance the tape with advancing movement of Said conveyor belt;
- a triangular array of rollers including a drive roller supporting said conveyor belt and the tape for sequential passage through a driving-in region, said assembly position and a driving-out region;
- guide means for retaining the tape in positive engagement with said belt after said assembly position;
- said drive roller being located at the end of said guide means and positively engaging said belt to draw said belt and said tape through said sequential passage;
- one of said rollers defining one corner of said triangular array at the assembly position, said one corner being spaced a larger distance from one of the other corners than said other corners are from each other so that said conveyor belt and the tape travel along a V-shaped path through said assembly position.

18. Assembly tool as claimed in claim 17 wherein said one corner of said triangular array is spaced from each of the other corners than said other corners are from each other.

19. Assembly tool for detaching and applying components lined up continuously and attached to a tape at an assembly position in which one component after the other is successively separated from the tape and delivered to a workpiece, comprising:
- a continuous conveyor belt;
- said belt including elements for positively engaging the tape to advance the tape with advancing movement of said conveyor belt;
- a triangular array of rollers including a drive roller and a plurality of idler rollers supporting said conveyor belt and the tape for sequential passage through a driving-in region, said assembly position and a driving-out region;
- said drive roller being located after said assembly position and positively engaging said belt to draw said belt and said tape through said sequential passage;
- one of said idler rollers defining one corner of said triangular array at the assembly position, said one corner being spaced a larger distance from one of the other corners than said other corners are from each other so that said conveyor belt and the tape travel along a V-shaped path through said assembly position.

20. Assembly tool as claimed in claim 19 and further including guide means positioned to retain said tape in engagement with a plurality of said elements.

21. Assembly tool as claimed in claim 19 wherein said one corner of said triangular array is spaced from each of the other corners than said other corners are from each other.

22. Assembly tool as claimed in claim 21 and further including guide means positioned to retain said tape in engagement with a plurality of said elements both before and after said assembly position.

23. Assembly tool as claimed in claim 21 and further including guide means positioned to retain said tape in engagement with a plurality of said elements as said tape and said belt approach said drive roller.

* * * * *